(12) United States Patent
Lu et al.

(10) Patent No.: US 11,826,699 B2
(45) Date of Patent: Nov. 28, 2023

(54) STRIPPING H2S OFF NATURAL GAS FOR MULTIPLE ISOTOPE ANALYSES

(71) Applicant: SAUDI ARABIAN OIL COMPANY, Dhahran (SA)

(72) Inventors: Feng Hu Lu, Dhahran (SA); Mohanned A. Ghamdi, Dammam (SA); Owaidh S. Harthi, Dammam (SA); Abdullah S. Hajri, Dammam (SA); Jaffar Mohammad Al-Dubaisi, Awamiya (SA); Mohammad A. Alrowaie, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 157 days.

(21) Appl. No.: 17/339,499

(22) Filed: Jun. 4, 2021

(65) Prior Publication Data
US 2022/0387931 A1 Dec. 8, 2022

(51) Int. Cl.
*B01D 53/26* (2006.01)
*B01D 53/78* (2006.01)
(Continued)

(52) U.S. Cl.
CPC .......... *B01D 53/52* (2013.01); *B01D 53/261* (2013.01); *B01D 53/78* (2013.01); *B60P 3/005* (2013.01);
(Continued)

(58) Field of Classification Search
CPC ...... B01D 53/52; B01D 53/261; B01D 53/78; B01D 2251/60; B01D 53/346; B01D 2252/103; B01D 2256/245; B01D 2257/80; B01D 2258/05; B01D 2259/4566; B60P 3/005; C10L 3/103; C10L 2290/542;
(Continued)

(56) References Cited

U.S. PATENT DOCUMENTS 3,087,793 A 4/1963 Hay
3,767,766 A * 10/1973 Tjoa et al. ........... B01D 53/526
95/181
(Continued)

FOREIGN PATENT DOCUMENTS

CN 107021600 A 8/2017
CN 210001835 U 1/2020
(Continued)

OTHER PUBLICATIONS

International Search Report Issued in Corresponding Application No. PCT/US2022031393, dated Sep. 8, 2022, pages.
(Continued)

*Primary Examiner* — Huy Tram Nguyen
(74) *Attorney, Agent, or Firm* — Osba Bergman Watanabe & Burton LLP

(57) ABSTRACT

Embodiments may include a hydrogen sulfide scrubber system that includes a charging chamber, a reaction vessel, and a treated gas trap. Embodiments may include a mobile vehicle, vessel, or platform that includes a mobile vehicle, vessel, or platform with a mounted hydrogen sulfide scrubber system. The hydrogen sulfide scrubber system is configured as previously described. Embodiments may include a method of using a hydrogen sulfide scrubber system.

16 Claims, 6 Drawing Sheets

(51) Int. Cl.
  *C10L 3/10* (2006.01)
  *B01D 53/52* (2006.01)
  *B60P 3/00* (2006.01)

(52) U.S. Cl.
  CPC .......... *C10L 3/103* (2013.01); *B01D 2251/60* (2013.01); *C10L 2290/542* (2013.01)

(58) Field of Classification Search
  CPC .............. C10L 2290/08; C10L 2290/24; C10L 2290/46; C10L 2290/541; C10L 2290/545; C10L 2290/567
  USPC ........................................................ 422/600
  See application file for complete search history.

(56) References Cited

U.S. PATENT DOCUMENTS

| | | |
|---|---|---|
| 4,388,293 A | 6/1983 | Diaz |
| 4,876,075 A | 10/1989 | Van Kleeck |
| 4,880,609 A | 11/1989 | Naraghi |
| 5,403,567 A | 4/1995 | Smith et al. |
| 5,916,438 A | 6/1999 | Trocciola et al. |
| 6,416,729 B1 | 7/2002 | DeBerry et al. |
| 6,893,484 B2 | 5/2005 | Thomas |
| 9,708,196 B2 | 7/2017 | Brenize et al. |
| 2006/0251571 A1 | 11/2006 | Gianna et al. |
| 2007/0199902 A1 | 8/2007 | Mueller et al. |
| 2012/0148465 A1 | 6/2012 | Huang et al. |
| 2013/0001135 A1 | 1/2013 | Bares et al. |
| 2013/0123561 A1 | 5/2013 | Nagl |
| 2020/0063054 A1 | 2/2020 | Versteeg et al. |
| 2020/0254387 A1 | 8/2020 | Buckenham |

FOREIGN PATENT DOCUMENTS

| | | |
|---|---|---|
| CN | 108722148 B | 5/2021 |
| EP | 1656983 A1 | 5/2006 |
| EP | 3616774 P | 3/2020 |

OTHER PUBLICATIONS

Written Opinion Issued in Corresponding Application No. PCT/US2022031393, dated Sep. 8, 2022, 6 pages.

* cited by examiner

STRIPPING H2S OFF NATURAL GAS FOR MULTIPLE ISOTOPE ANALYSES

BACKGROUND

Hydrogen sulfide (H2S) is both a toxic to humans and a common component in natural gas and other hydrocarbon-bearing reservoirs having gaseous hydrocarbon content. Study of the mobility and origin of hydrogen sulfide is performed to appreciate the quality of the hydrocarbon gas with which the hydrogen sulfide is associated. More importantly, researching and understanding various aspects of hydrogen sulfide also supports safe and effective exploration and production activities as well as the protection of personnel that work with and around such gases.

One of the most effective approaches to understand hydrogen sulfide is to analyze sulfur and its isotopes. The analysis of the stable isotopes of sulfur is a fingerprinting technique to investigate the origin and mobility of H2S. Research of sulfur isotopes is important for understanding the quality of natural gas.

SUMMARY

This Summary is provided to introduce a selection of concepts that are further described in the Detailed Description. This summary is not intended to identify key or essential features of the claimed subject matter, nor is it intended to be used as an aid in limiting the scope of the claimed subject matter.

One or more embodiments may include a hydrogen sulfide scrubber system. The hydrogen sulfide system includes a charging chamber. The charging chamber is configured to be fluidly isolated from a source of gas with hydrogen sulfide, a source of an inert purge gas, and a reaction vessel. The hydrogen sulfide system also includes the reaction vessel. The reaction vessel is coupled downstream of the charging chamber. The reaction vessel is configured to intimately intermix the gas with hydrogen sulfide with a hydrogen sulfide reaction solution to form a hydrogen sulfide-free gas and an insoluble sulfur reaction product. The reaction vessel is also configured to be fluidly isolated from both the charging chamber and a treated gas trap. The hydrogen sulfide scrubber system also includes the treated gas trap. The treated gas trap is coupled downstream of the reaction vessel. The hydrogen sulfide scrubber system is configured to couple to the source of gas with hydrogen sulfide upstream of the charging chamber. The hydrogen sulfide scrubber system is also configured to couple to the source of an inert purge gas upstream of the charging chamber The hydrogen sulfide scrubber system is also configured to couple to a receiver for the hydrogen sulfide-free gas downstream of the treated gas trap.

One or more embodiments may include a mobile vehicle, vessel, or platform that includes a mobile vehicle, vessel, or platform with a mounted hydrogen sulfide scrubber system. The hydrogen sulfide scrubber system is configured as previously described.

One or more embodiments may include a method of using a hydrogen sulfide scrubber system. The hydrogen sulfide scrubber system is configured as previously described. The method may include introducing a gas with hydrogen sulfide into a charging chamber of the hydrogen sulfide scrubber system. The method may also include operating the hydrogen sulfide scrubber system such that the gas with hydrogen sulfide is introduced into a reaction vessel from the charging chamber. The method may also include operating such that the gas with hydrogen sulfide is converted into an insoluble sulfur reaction product and a hydrogen sulfide-free gas using a hydrogen sulfide reaction solution contained within the reaction vessel. The method may also include introducing an inert purge gas into the charging chamber of the hydrogen sulfide scrubber system such that the inert purge gas sweeps any non-inert gas from the hydrogen sulfide scrubber system. The method may also include recovering the hydrogen sulfide-free gas and recovering the insoluble sulfur reaction product from the reaction vessel.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

In the figures, down are toward or at the bottom and up are toward or at the top of the figure. "Up" and "down" are generally oriented relative to a local vertical direction. However, "upstream" may more generally refer to objects, units, or processes, taken before a particular unit or process. As well, "downstream" may more generally refer to objects, units, or processes, taken after a particular unit or process.

DETAILED DESCRIPTION

Figure 1:
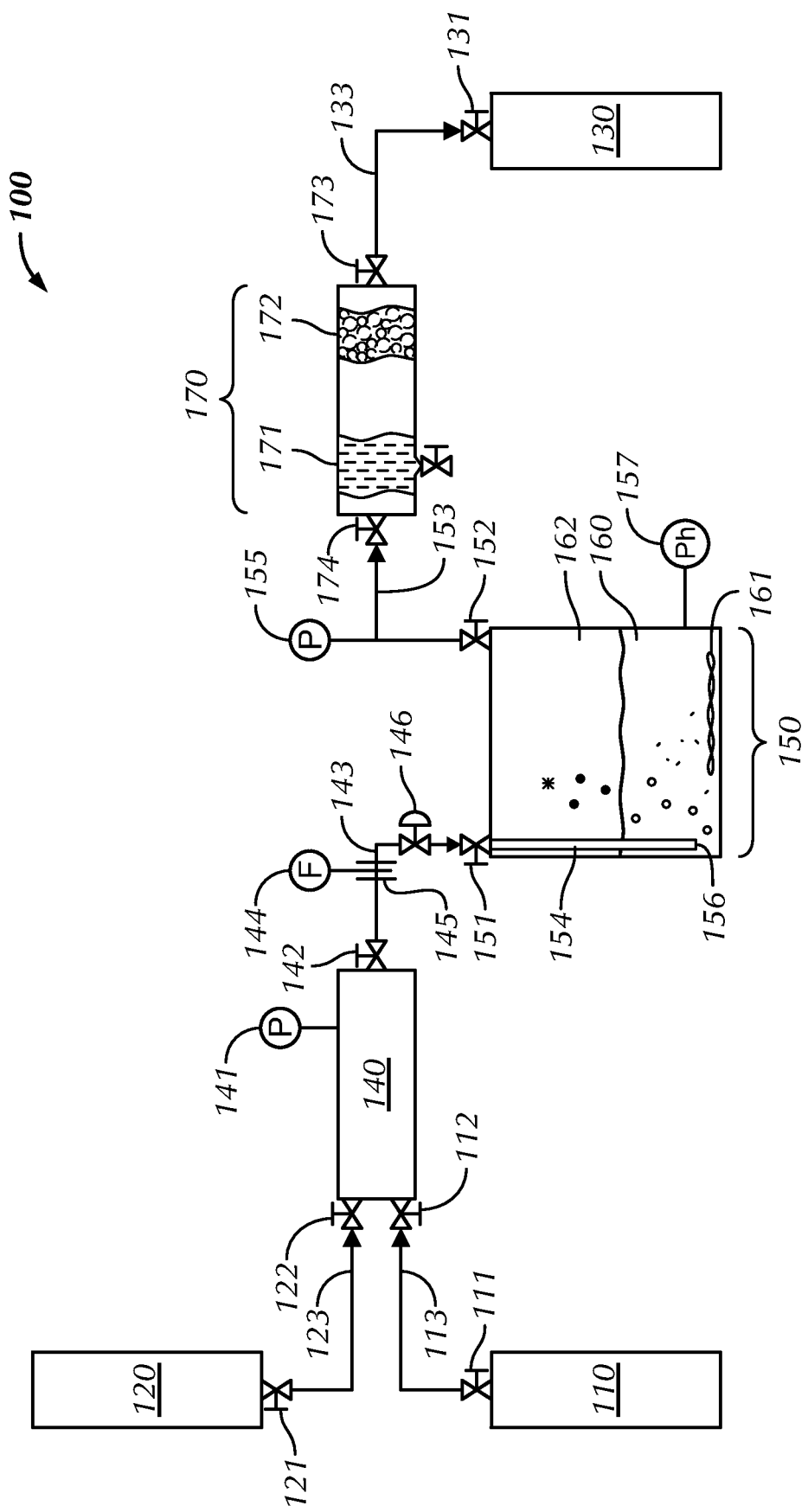
FIG. 1 is a schematic of a H2S scrubbing system according to one or more embodiments.

FIG. 1 is a schematic of a H2S scrubbing system. The H2S scrubbing system 100 ("system 100") includes a source for gas with H2S, such as feed gas canister 110, a source for inert purge gas, such as purge tank 120, and a receiver for gas without H2S, such as remainder gas canister 130. The feed gas canister 110 has an isolation valve 111 to permit the feed gas canister 110 to couple to the system 100. The purge tank 120 has an isolation valve 121 to permit the purge tank 120 to couple to the system 100. The remainder gas canister 130 has an isolation valve 131 to permit the remainder gas canister 130 to couple to the system 100.

The system 100 includes a charging chamber with a fixed volume, such as charge line 140, for receiving a fixed quantity of gas with H2S. Charge line 140 is coupled downstream of both feed gas canister 110 by line 113 and purge tank 120 by line 123. A pressure gauge 141 is shown coupled to charge line 140 to monitor pressure in the charge line 140. A line 143 coupled downstream of the charge line 140 includes an optional orifice plate 145 and an optional flow control valve 146. In this instance, orifice plate 145 supports a flow meter 144 that permits monitoring of the flow from charge line 140.

The main conversion of hydrogen sulfide in system 100 occurs in a reaction vessel, such as reactor 150. Reactor 150 is shown in FIG. 1 coupled downstream of charge line 140 through line 143. The reactor 150 has an isolation valves, such as intake valve 151 and discharge valve 152, on the exterior of the reactor 150. The reactor 150 also has a dip tube 154 in the interior of the reactor 150 for bubbling a gas into a solution.

Reactor 150 may contain a H2S reaction solution 160. The H2S reaction solution 160 is configured to react with the hydrogen sulfide in the gas with H2S to form both an insoluble sulfur reaction product 161 and a wet H2S-free gas 162. The wet H2S-free gas 162 is the gas with H2S after H2S has been stripped from it. The insoluble sulfur reactor product 161 precipitates to the bottom of reactor 150.

A line 153 downstream couples to reactor 150 at discharge valve 152 such that wet H2S-free gas 162 may pass from reactor 150. Optionally, a pH sensor 157 couples to the reactor 150 below the liquid level. A pressure gauge 155 is shown coupled to line 153 to permit monitoring of the pressure within the reactor and units downstream.

The wet H2S-free gas passes from reactor 150 into a treated gas trap downstream, such as post-reactor treatment vessel 170, using line 153. Post-reactor treatment vessel 170, shown in partial reveal in FIG. 1, has two features—a back-and-forth demister section 171 and a desiccant section 172—that the wet H2S-free gas passes through to convert it into a dry H2S-free gas. After passing through line 133, the dry H2S-free gas passes into remainder gas canister 130.

The gas with hydrogen sulfide that is introduced into the H2S scrubbing system may comprise any gas or vapor that contains at least in part hydrogen sulfide. Non-limiting examples include, but are not limited to, dry and wet natural gas, condensate gas, associated gas, sour gas, air sample, landfill gas, coal gas, partially-refined natural gas, and cracked refinery gases, and other hydrocarbon or non-hydrocarbon-containing gases or vaporizable liquids that contains hydrogen sulfide.

In one or more embodiments, the source of the gas with hydrogen sulfide may be a portable source, such as a tank, a cylinder, a bomb, a vessel, a container, or other device, that may hold a hydrogen sulfide containing gas at atmospheric or elevated pressure. FIG. 1 shows feed gas canister 110 with an isolation valve 111. Such containers may be configured to temporarily couple to an embodiment H2S scrubbing system for introducing the gas with hydrogen sulfide into the system.

In one or more embodiments, the source of gas with hydrogen sulfide may be a fixed source, such as a pipeline or process vessel, that contains a gas with hydrogen sulfide. Such a fixed source may be temporarily coupled to an embodiment to introduce a gas containing hydrogen sulfide. Such a configuration is associated with FIG. 4. In one or more other embodiments, the fixed source may be a permanently coupled or connected line to the embodiment system. In such a configuration, the source of the gas with hydrogen sulfide is "hard piped" or "hard lined". Such a "hard" configuration, where a conduit or line is coupled or connected to an embodiment system, is useful for intermittent or continuous monitoring of a single source or a set of sources. For example, it may be envisioned that a laboratory associated with a gas processing facility may have one or more hard lines—one from each source—configured in an array that is coupled to an embodiment system to perform regular testing on gas with hydrogen sulfide originating from different sources, such as wells or feed pipelines.

Regardless of whether the source is portable or fixed, the source is configured to contain and withstand the pressure of the gas containing hydrogen sulfide. In one or more embodiments, the pressure of the gas containing hydrogen sulfide in the source is in a range of from about 10 to 5000 psi (pounds per square inch), such as from about 50 to 5000 psi. In one or more embodiments, the temperature of the gas containing hydrogen sulfide in the source is in a range of from about 0 to 200° C.

The inert purge gas that is introduced into the H2S scrubbing system may comprise any gas or vapor that is chemically inert to the gas with hydrogen sulfide. FIG. 1 shows purge tank 120 has an isolation valve 121. Since it is of investigative interest to examine the resultant hydrogen sulfide-free gas, any interaction with the precursor gas with hydrogen sulfide or the hydrogen sulfide-free gas, such as confounding the isotope or chemical analysis of the gas (other than dilution by volume) is not an objective. As well, it is also not of interest to be reactive with the hydrogen sulfide reaction solution as the solution is used to extract hydrogen sulfide and form the insoluble sulfur reaction product. Non-limiting examples of useful inert purge gas include, but are not limited to, the noble gases, such as helium and mixtures thereof. Selection of an inert purge gas should be cognizant of the inclusion of the inert gas in any post-collection analysis of the hydrogen sulfide-free gas, such as by mass spectrometry. It is not desired to confound the analysis of the hydrogen sulfide-free gas for either compositional makeup or isotope analysis.

In one or more embodiments, the gas with hydrogen sulfide is introduced into the system by way of the charging chamber.

Similar to the sources of gas with hydrogen sulfide, a source of inert purge gas in one or more embodiments may be provided in a portable container, such as a tank, a cylinder, a bomb, a vessel, a canister, or other device, that may hold an inert purge gas at atmospheric or elevated pressure. In one or more other embodiment, the source of an inert purge gas may be provided through a pipeline or process vessel that contains an inert purge gas. For example, an air separations plant or a natural gas separations plant may provide a source for such an inert purge gas. In one or more embodiments, the source of the inert purge gas may be provided through a permanently coupled or connected line to the embodiment H2S scrubbing system. In such a configuration, the source of the inert purge gas is "hard piped" to an embodiment system for intermittent or continuous use to purge an embodiment system. As with the prior example for the laboratory system, this would be a logical configuration for an embodiment system conducting multiple examinations in parallel or series.

In one or more embodiments, the H2S scrubbing system may include a charging chamber. The charging chamber may be a fixed volume vessel or a length of process pipe or line that is positioned between the source of gas with hydrogen sulfide and the reaction vessel. The charging chamber may be isolated such that a fixed amount of gas with hydrogen sulfide at a given pressure is confined in the charging chamber before introduction into the reaction vessel, thereby "charging" the charging chamber. In FIG. 1, charging line 140 has three isolation valves (112, 122, 142) that permit charging line 140 to be filled and pressurized with the gas with hydrogen sulfide from feed gas canister 110, and be fluidly isolated.

Figure 2A:
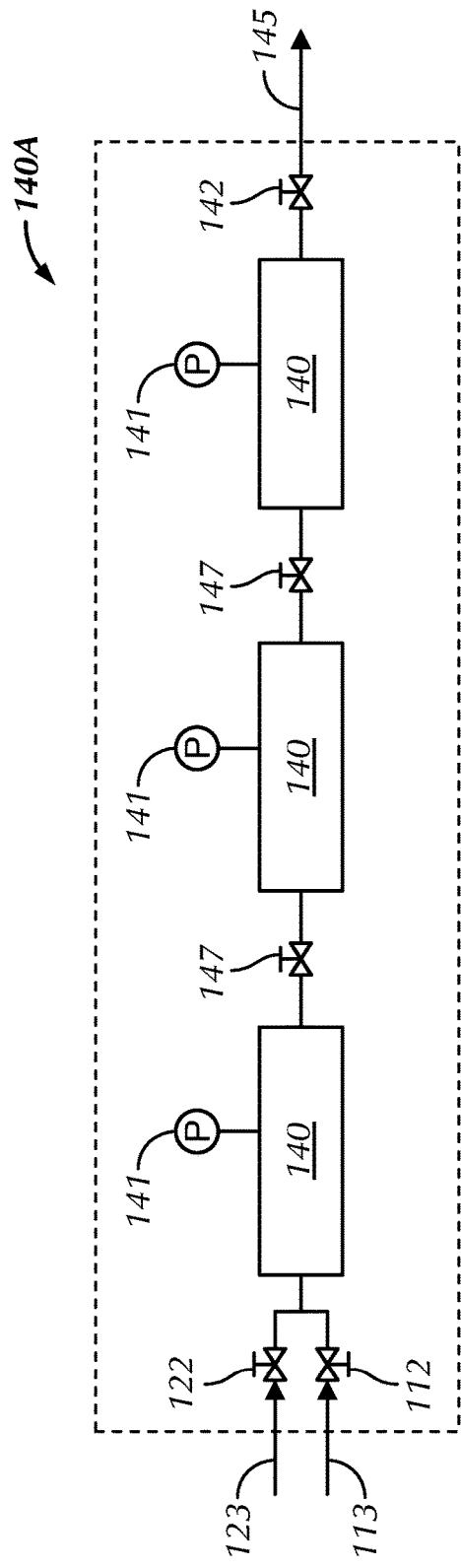
FIGS. 2A, 2B, and 2C, are schematics of several useful charging chambers for the system according to one or more embodiments.
Figure 2B:
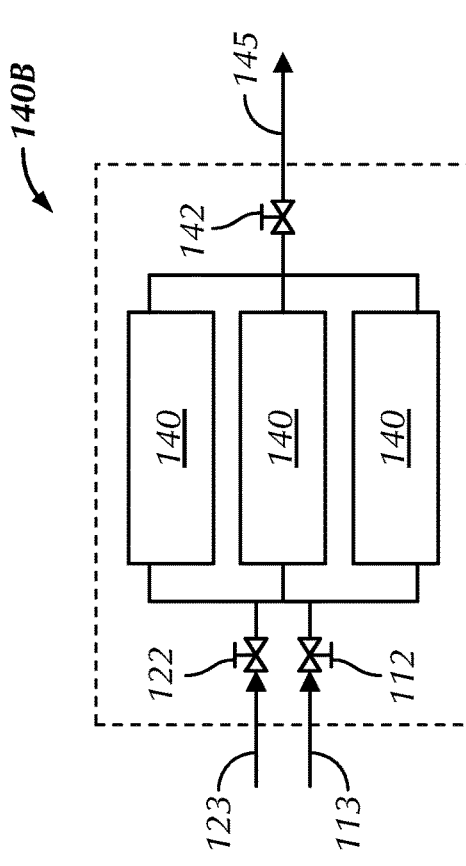
Figure 2C:
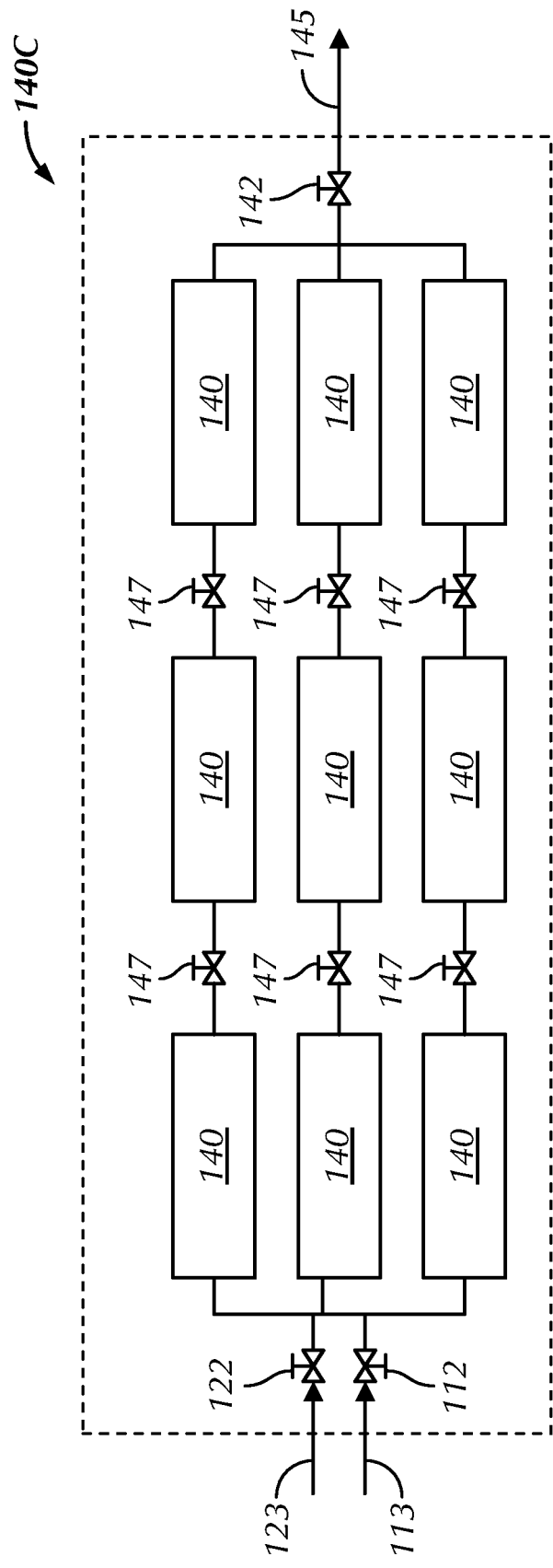

In one or more embodiments, the charging chamber may comprise a plurality of fixed volume vessels or lengths of process piping or line coupled to one another. In one or more embodiments, the plurality of fixed volume vessels may be coupled to one another in series. FIGS. 2A, 2B, and 2C, are schematics of several useful charging chambers for the system according to one or more embodiments. In FIG. 2A, charging chamber 140A is shown with several charging chambers 140 couple in series. Charging chamber 140A is shown relative to the other portions of H2S scrubbing system 100. In such a configuration, between each fixed volume vessel or length of processing pipe or line a valve 147 is positioned. This permits each charging chambers 140 within charging chamber 140A to be isolated from an adjacent charging chamber 140 upstream or downstream. Valve 147 may also permit throttling of the gas with hydrogen sulfide as it is transferred downstream between adjacent charging chambers 140 within charging chamber 140A, decreasing its pressure each time. Throttling will be described in more detail forthcoming.

In one or more embodiments, the plurality of fixed volume vessels may be coupled to one another in parallel. In FIG. 2B, charging chamber 140B is shown with several charging chambers 140 couple in parallel. Such a configuration may permit the "charging" of charging chamber 140B and then controlled discharge of each parallel chamber 140 in turn. Such a configuration may prevent overwhelming the reactor.

In one or more embodiments, several of the plurality of fixed volume vessels may be coupled to one another in series, and a plurality of such series may be coupled to one another in parallel, forming an array of charging chambers. In FIG. 2C, charging chamber 140C is shown with several charging chambers 140 couple in series, and several series coupled in parallel to one another. Between each fixed volume vessel or length of processing pipe or line a valve 147 is positioned. Although not wanting to be bound by theory, it is believed that the previously-described benefits of both charging chamber 140A and 140B configurations may be achieved in the 140C configuration.

The configurations as shown in FIGS. 2A-C also permit the volume of the charging chamber during isolation to be changed, that is, to be expanded. By isolating a volume of gas in the charging chamber, the volume may be increased while still isolated within the charging chamber portion of the system by opening an isolation valve between adjacent charging chambers. This will cause the gas in the charging chamber to be depressurized in ratio to the greater volume created. In one or more embodiments, the volume of the charging chamber before expansion to the volume of the charging chamber after expansion is in a ratio range of from about greater than 1:1 to 1:5, such as from greater than about 1:1 to 1:4, such as from greater than about 1:1 to 1:3, and such as greater than about 1:1 to 1:2.

"Throttling" is a technique where a flow restriction is introduced in a line, such as a partially-opened flow control valve, that creates an effect where a gas passing through the valve undergoes volume expansion and a reduction in both temperature and pressure. An isolation or flow control valve upstream of the charging chamber may be configured such that the gas with hydrogen sulfide passes through the valve and is "throttled" such that the pressure of the gas passing into the chagrining chamber is reduced. A person of ordinary skill in the chemical processing arts may appreciate that such a technique in using a valve or another flow-type restriction including, but not limited to, an orifice plate, a let-down valve, or a venturi, may be used to reduce the temperature of, extract energy from, and reduce the pressure of, a stream flowing through the restriction. As well, the same person will also be familiar with configurations of valves that are specifically designed for throttling service.

In one or more embodiments, the gas with hydrogen sulfide may be introduced into the H2S scrubbing system such that a pressure equilibrium is achieved between the source of the gas with hydrogen sulfide and the charging chamber. In using the system of FIG. 1 as an example, upon obtaining equilibrium with the feed gas canister 110, the charging line 140 may be isolated from feed gas canister 110 (thereby completing the "charge"). Then, the gas with hydrogen sulfide may be introduced into reactor 150 (and "discharging" the charging line 140) at full or reduced pressure.

In one or more embodiments, the gas with hydrogen sulfide may be introduced into the H2S scrubbing system such that the charging chamber has a reduced pressure as compared to the pressure of the source of the gas with hydrogen sulfide. In such an instance, the flow between the source and the charging chamber may be throttled or otherwise the flow restricted to cause a reduction in pressure in the gas with hydrogen sulfide flowing into the charging chamber.

The configuration of the charging chamber relative to portions of the H2S scrubbing system may be such that the gas with hydrogen sulfide passing from the charging chamber expands in volume and its pressure is reduced. For example, the ratio of the volume of the charging chamber, such as charging line 140 of system 100, may be in relationship to the volume of the charging chamber, the line coupling the charging chamber and the reaction vessel, such as line 143, and the reaction vessel, such as reactor 150, of FIG. 1. In one or more embodiments, the volume of the charging chamber to the combined volume of the charging chamber, a line coupling the charging chamber and the reaction vessel, and the free vapor space of the reaction vessel, is in a ratio range of from about 1:2 to 1:2000, such as from about 1:1 to 1:1000, such as from about 1:1 to 1:500, such as from about 1:1 to 1:250, such as from about 1:1 to 1:100, such as from about 1:1 to 1:50, such as from about 1:1 to 1:25, such as from about 1:1 to 1:10, such as from about 1:1 to 1:5, such as from about 1:1 to 1:2.

In one or more embodiments, the H2S scrubbing system may include a pressure monitoring system, such as a pressure sensor or gauge, associated with the charging chamber. In one or more embodiments, the pressure monitoring system is coupled to the charging chamber. In other one or more embodiments, the pressure monitoring system is coupled upstream or downstream of the charging chamber in a way the pressure within the charging chamber is detectable. For example, FIG. 1 shows pressure gauge 141 is configured as part of system 100 to detect the pressure in charging line 140. Such a pressure monitoring system may be useful to ensure that the operating pressure of the reaction vessel is not exceeded when the gas with hydrogen sulfide in the charging chamber is introduced into the reaction vessel.

In one or more embodiments, the contents of the charging chamber may be discharged in a continuous manner. The gas with hydrogen sulfide may be introduced into the reaction vessel in a continuous yet metered manner. In one or more embodiments, an isolation or flow control valve downstream of the charging chamber, such as flow control valve 146, may be a valve that is configured to "throttle", such as has been previously described, or merely limit the flow rate of the gas with hydrogen sulfide as it passes from the charging chamber such that the gas discharges in a regulated and continuous manner.

In one or more embodiments, the contents of the charging chamber may be discharged in an intermittent manner. For intermittent discharging, a portion of the gas with hydrogen sulfide may be discharged from the charging chamber by opening at least partially a downstream isolation or flow control valve. After a sufficient period, the charging chamber may be isolated by closing the same valve before the entire contents of the charging chamber have been discharged. This opening-and-closing process may be repeated as many times as necessary to fully discharge the contents of the charging chamber. Performing the introduction of the gas with hydrogen sulfide into the reaction vessel in this manner may permit the reaction vessel to process the contents of the charging chamber in a "batch-like" manner; A limited amount of gas in each intermittent discharge is introduced at any given time. For example, an amount of gas with hydrogen sulfide may be introduced from the charging chamber until a visible amount of insoluble sulfur reaction product begins to form, and then the flow from the charging chamber is terminated. When no additional insoluble sulfur reaction product forms in the reaction vessel, the process of introduction may be repeated and another amount of gas with hydrogen sulfide may be introduced. Such an intermittent introduction process may be repeated until the pressure in the charging chamber and the reaction vessel reaches equilibrium. At equilibrium, there is insufficient pressure drive in the charging chamber to motivate gas with hydrogen sulfide in the charging chamber into the hydrogen sulfide reaction solution contained in the reaction vessel.

In one or more embodiments, the H2S scrubbing system may optionally include a flow restriction downstream of the charging chamber and upstream of the reaction vessel. The flow restriction may be configured to limit the mass or volume flow rate of gas with hydrogen sulfide as it is introduced into the reaction vessel. Such a restriction may be useful to ensure that the system used to intimately intermix the gas with hydrogen sulfide and the hydrogen sulfide reaction solution avoids being overwhelmed, such as by preventing "blow through" (where a liquid is physically pushed aside by the force of a gas stream and some of the gas is able to freely move through the reaction vessel without contacting the hydrogen sulfide reaction solution) or "slugging" (where the hydrogen sulfide reaction solution is physically pushed into a vapor overhead line). In one or more configurations, the flow restriction may also "throttle" the gas with hydrogen sulfide from the charging chamber and cause its pressure to be reduced after the gas passes the restriction. In one or more embodiments, a flow control valve may be coupled upstream of the reaction vessel and positioned between the charging chamber and the reaction vessel. For example, a flow control valve, such as flow control valve 146 of system 100, may restrict the flow of the gas with hydrogen sulfide into the reaction vessel.

In one or more embodiments, the H2S scrubbing system may include a flow rate monitoring system, such as a flow sensor or meter. In one or more embodiments, the flow monitoring system is positioned between the charging chamber and the reaction vessel. The flow monitoring system is positioned such that it may detect or determine (such as by pressure differential) the flow rate of gas with hydrogen sulfide being introduced into the reaction vessel. For example, as seen in FIG. 1, flow meter 144 is configured as part of system 100 to detect a pressure drop across orifice plate 145 such that the flow rate in line 143 is determinable. Such a flow rate monitoring system may be useful to determine the amount of gas with hydrogen sulfide being introduced into the reaction vessel such that it is not overwhelmed with gas flow.

In one or more embodiments, the gas with hydrogen sulfide passes from the charging chamber and is introduced at least in part into the reaction vessel.

The reaction vessel in one or more embodiments provides a volume where the gas with hydrogen sulfide may intimately intermix with a reaction solution such that hydrogen sulfide may be extracted from the gas with hydrogen sulfide, react with the disassociated ions from a metal salt, and form an insoluble sulfur reaction product that may be collected. In doing so, the gas with hydrogen sulfide is converted into a crude hydrogen sulfide-free gas. Both products, by having hydrogen sulfide chemically eliminated, are now safer to handle than the gas with hydrogen sulfide.

Materials of construction for the reaction vessel in one or more embodiments may include materials such as metals, non-metals, and combinations thereof. Materials to be avoided include those that are susceptible to reactions with solubilized acid gases, such as hydrogen sulfide and carbon dioxide. A selected material should avoid absorbing hydrogen sulfide onto its surface. Examples of useful metals include pure and alloys of metals, such as, but not limited to, stainless steel and combinations thereof. Non-metals and composite materials that may be useful as part of the reaction vessel may include ceramics, such as laboratory-grade glass, Pyrex®, and borosilicate glass; fiberglass; and graphite-reinforced and carbon-fiber composites; and combinations thereof. Polymers that may be useful in reaction vessel construction may include, but are not limited to, polyvinyl chloride (PVC); chlorinated polyvinyl chloride (CPVC); polypropylene (PP) homopolymers and copolymers thereof; polyethylene (PE) homopolymers, such as high-density PE (HDPE), and copolymers thereof, such as PP/PE copolymers; ethylene-vinyl acetate (EVA) copolymers; polyacrylates, poly(meth)acrylates, and poly(alkyl (meth)acrylates), such as poly (methyl methacrylate), and other "acrylic glasses", copolymers thereof, and combinations thereof; and fluorinated polymers, such as polytetrafluoroethylene (PTFE), and copolymers thereof; and combinations thereof.

In one or more embodiments, that the reaction vessel is configured such that at least a portion is non-opaque. "Non-opaque" means that visible light may be used to view the interior contents of the reaction vessel; therefore, a portion of the reaction vessel may comprise a semi-transparent or fully transparent material. "Semi-transparent" means that some amount of visible light is blocked but that enough transparency exists that an operator or a camera imaging visible light may discern the internal contents of the vessel. Borosilicate glass may be considered semi-transparent. In one or more embodiments, the reaction vessel may be fully transparent.

In such one or more embodiments, the reaction vessel may be comprised of two or more materials to provide for multiple useful properties. For example, the reaction vessel may comprise components of stainless steel for connections, the gas with hydrogen sulfide entry tubing, and reinforcement bands against stresses induced by internal pressure. In such an example, the body of the reaction vessel may mainly comprise a polyacrylic glass of several centimeters of thickness for strength, optical visibility of the internal activities of the reaction vessel, and reduction of weight that a polymer provides over other metal materials.

In one or more embodiments, the reaction vessel is configured to withstand an internal pressure in a range of from about 14.7 to 5000 pounds per square inch (psi), such as having a lower limit of from about 14.7, 15, 20, 30, 50, 100, and 200 psi, to having an upper limit of about 100, 200, 300, 400, 500, 750, 1000, and 5000 psi, where any lower limit may be associated with any mathematical feasible upper limit.

In one or more embodiments, the reaction vessel is configured to withstand a temperature in a range of from about 0 to 200° C., such as having a lower limit of from about 0, 5, 10, 15, 20, 25, 30, 35, 40, 45, 50, and 55° C., to having an upper limit of about 10, 20, 30, 40, 50, 75, 100, and 200° C., where any lower limit may be associated with any mathematical feasible upper limit.

The internal configuration of the reaction vessel is such that it permits intimate intermixing of the gas with hydrogen sulfide and the hydrogen sulfide reaction solution. The intimate intermixing permits the reaction between hydrogen sulfide and the disassociated ions of the metallic salt within the hydrogen sulfide reaction solution to form the insoluble sulfur reaction product. As well, as a resultant of the intimate intermixing, a hydrogen sulfide-free gas forms that may also be further processed and recovered for analysis.

The internal configuration of the reaction vessel may vary depending on several processing factors, including, but not limited to, pressure and temperature constraints of the reaction vessel material of construction, the volume of gas with hydrogen sulfide to be processed, the amount of hydrogen sulfide reaction solution that the reaction vessel contains, the amount of insoluble sulfur reaction product to collect, and the amount of hydrogen sulfide-free gas to be collect. The total weight of a reaction vessel, including insoluble sulfur reaction product, hydrogen sulfide reaction solution, and inert purge gas, and whether it may be safely handled by a human with or without mechanical assistance is another consideration in some configurations of embodiments, for example, H2S scrubbing systems for use in the field. Another consideration may also be simplicity of configuration such that if any repairs are necessary to a reaction vessel a person may be able to remedy defects in the internal configuration of the reaction vessel in the field with simple hand-held tools.

An example of some of the aspects of an internal configuration of a reaction vessel have been previously given in the description of FIG. 1. The reactor 150 has a dip tube 154 with an open end 156 that is below the liquid/gas interface of the hydrogen sulfide reaction solution. This design configuration not only provides for an easy indication of the appropriate internal level of hydrogen sulfide reaction solution that should be present in the reactor 150 (above the open end 156) but also ensures intimate intermixing of the hydrogen sulfide reaction solution 160 with the gas with hydrogen sulfide as the gas bubbles through the solution 160.

Figure 3A:
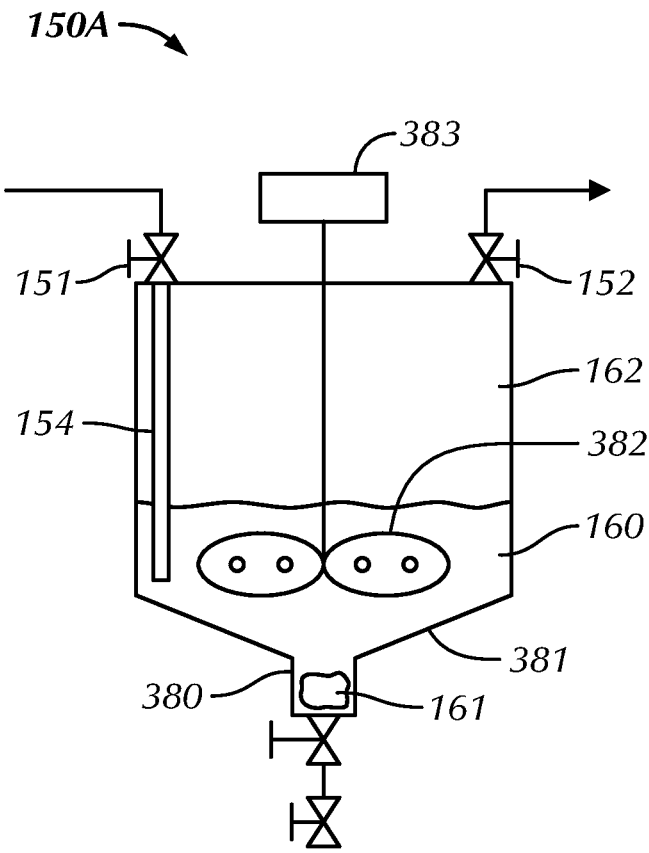
FIGS. 3A and 3B are schematics of several useful reaction vessels for the system according to one or more embodiments.
Figure 3B:
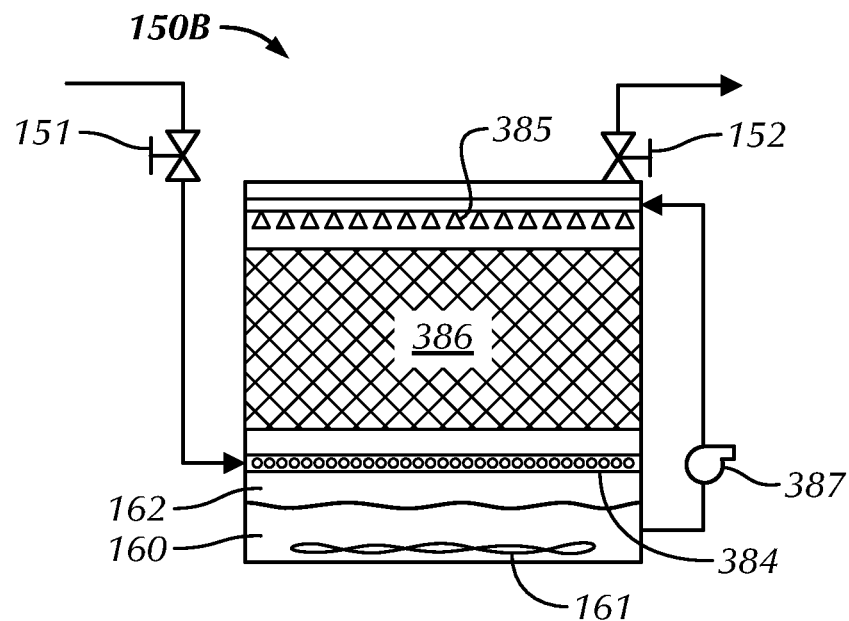

Two more examples of possible reaction vessel configurations are also given in FIGS. 3A and 3B. FIGS. 3A and 3B are schematics of several useful reaction vessels for the H2S scrubbing system. Besides the reactor 150 shown in FIG. 1 as part of system 100, one or more embodiments may include variations in reaction vessel configuration that may have features useful for intimately intermingling the gas with H2S with the H2S reaction solution. FIG. 3A shows a reactor 150A that may be a useful in one or more embodiments. Reactor 150A may include features such as a settling trap 380 and a sloped bottom 381. As well, reactor 150A may feature a mixing paddle 382 and a motor 383 to mix the H2S reaction solution 160 with the H2S containing gas as it comes from the dip tube 154.

FIG. 3B shows another reactor 150B that may be a useful in one or more embodiments. Reactor 150B may include a gas sparger 384 instead of a dip tube for distributing the gas with H2S into the interior of the reactor 150B. A set of spray nozzles 385 distributes the H2S reaction solution into a packing structure 386. The packing structure 386 may be a random distribution of packing, a structured packing element, or a combination thereof. As the liquid H2S reaction solution trickles generally downward and the gas with H2S generally moves upward, the reaction removing the H2S from the gas occurs within the packing structure 386. Any insoluble sulfur reaction product 161 that forms in the packing structure 386 is washed down into a pool of the reaction solution 160 below the gas sparger 384. A recycle line 387 conveys H2S reaction solution from below the gas sparger 384 to the spray nozzles 385.

Other configurations for the internal structure of the reaction vessel where the H2S reaction solution intimately intermixes with the gas with hydrogen sulfide are within the vision of a person of ordinary skill in the art of absorption and distillation process technology.

Optionally, one or more sensors may be coupled to the reaction vessel. For example, a temperature, a pressure, or a pH sensor, may be coupled to the exterior of the reaction vessel such that the conditions within the reaction vessel, including the liquid and the vapor spaces, may be detected or determined. In FIG. 1, a pH sensor 157 is shown coupled to the reactor 150 to detect the pH of the hydrogen sulfide reaction solution.

Contained within the reaction vessel is a hydrogen sulfide reaction solution. The purpose of the H2S reaction solution is to selectively remove hydrogen sulfide from the gas with hydrogen sulfide without removing other components from the gas with H2S. Recovering the sulfur atom (and isotopes thereof) for analysis as a product of H2S scrubbing system is of interest. In addition, the resultant of the reaction—the insoluble sulfur reaction product—is non-toxic. The stable, non- or low-toxicity insoluble sulfur reaction product permits safe transport, storage, and handling, of the resultant sulfur compounds. Finally, the hydrogen sulfide reaction solution should be a relatively easy and safe material to handle and, if necessary, make in the field from raw ingredients. The hydrogen sulfide reaction solution is also relatively safe to handle being made of a metallic salt and water. The hydrogen sulfide reaction solution may be introduced into the reaction vessel before or after the reaction vessel is coupled to the system.

The hydrogen sulfide reaction solution comprises water with a metallic salt. The hydrogen sulfide reaction solution may comprise metallic cations from the metallic salt. The metallic cations may include, but are not limited to, ions of zinc, iron, copper, silver, lead, cadmium, cobalt, magnesium, manganese, nickel, tin, mercury, and combinations thereof. Anions of the metallic salt that may form from the disassociation of the metallic salt may include, but are not limited to, nitrates, sulphates, phosphates, sulfites, nitrites, chlorides, bromides, iodides, fluorides, pyrophosphates and perchlorates. In one or more embodiments, the hydrogen sulfide reaction solution comprises a metallic nitrate salt, such as silver nitrate. In one or more embodiments, the insoluble reaction product is a metallic sulfide, such as silver sulfide.

The concentration and amount of metallic salt in the hydrogen sulfide reaction solution is sufficient to fully extract the hydrogen sulfide from the gas with hydrogen sulfide introduced into the reaction vessel. The concentration of hydrogen sulfide in the gas with hydrogen sulfide may be in a range of from about 0.1 to 40 mol. % (mole percent), such as about 0.1 to 20 mol. %. An insufficient amount of metallic salt in the hydrogen sulfide reaction solution would defeat the purpose of the system and its method of use. In such an instance, excess hydrogen sulfide would contaminate the hydrogen sulfide-"free" gas and all the potential sulfur isotopes from the gas with hydrogen sulfide would not be collected in as metallic sulfide salts.

In one or more embodiments, the hydrogen sulfide reaction solution may have a pH in a range of from about −1.0 to 7.7 before introduction of the gas with hydrogen sulfide, such as having a lower limit of from about −1.0, 0.0, 1.0, 2.0, 3.0, 4.0, and 5.0, to having an upper limit of about 3.0, 4.0, 5.0, 6.0, 7.0, 7.5, and 7.7, where any lower limit may be associated with a mathematical feasible of an upper limit. It is useful to have an acidic to slightly alkaline hydrogen sulfide reaction solution to prevent the absorption and conversion of carbon dioxide into carbonic acid in the hydrogen sulfide reaction solution. Many hydrocarbon-bearing gas samples contain an amount of carbon dioxide, which is useful to understand the composition of the formation gases. As well, carbon dioxide may also include isotopes of carbon, such as $C^{13}$, which also may be useful in analyzing the hydrogen sulfide-free gas for understanding aspects of the formation, such as source maturity.

In one or more embodiments, the pH of the hydrogen sulfide reaction solution is modified during operation of the system. In one or more embodiments, an amount of an acid or acid precursor may be introduced into the hydrogen sulfide reaction solution during the operation of the system such that the pH of the hydrogen sulfide reaction solution is maintained within a pH range of −1.0 to 7.7. An acid precursor is a compound that upon dissolution into the aqueous medium forms an acid. The acid or acid precursor may be added into the hydrogen sulfide reaction solution as a liquid, such as an aqueous solution, or a solid. The acid or acid precursor should not directly interfere with the composition of the gas with hydrogen sulfide, the hydrogen sulfide-free gas, or the insoluble sulfur reaction product, in the reaction vessel. In one or more embodiments, an acid or acid precursor that may be introduced into the hydrogen sulfide reaction solution includes nitric acid and acid precursors that degrade or disassociate into nitric acid.

In one or more embodiments, the hydrogen sulfide reaction solution may further comprise a buffering solution. A buffering solution may comprise a weak acid and its conjugate base. The buffering solution is to provide pH stability in the acidic to slightly alkaline range during the exposure of the hydrogen sulfide reaction solution. In one or more embodiments, an amount of a buffering solution may be introduced into the hydrogen sulfide reaction solution during the operation of the system such that the pH of the hydrogen sulfide reaction solution is maintained within a pH range of −1.0 to 7.7. The weak acid and its conjugate base should not directly interfere with the composition of the gas with hydrogen sulfide, the hydrogen sulfide-free gas, or the insoluble sulfur reaction product, in the reaction vessel. In one or more embodiments, a buffering solution may be introduced into the hydrogen sulfide reaction solution that produces nitrate ions.

In one or more embodiments, the hydrogen sulfide reaction solution may further comprise a reactive dye. The reactive dye may be a naturally occurring or synthetic, or both, compound that is used to visually monitor the pH of the hydrogen sulfide reaction solution during operation of the system. Examples of reactive dyes include halochromic compounds and the materials in Litmus paper. A shift in color may indicate a change in pH may require intervention, such as introduction of a buffer solution, an acid, or an acid precursor, into the reaction vessel, before additional introduction of gas with hydrogen sulfide continues. The reactive dye should not directly interfere with the composition of the gas with hydrogen sulfide, the hydrogen sulfide-free gas, or the insoluble sulfur reaction product, in the reaction vessel. In one or more embodiments, a halochromic compound may be introduced into the hydrogen sulfide reaction solution.

In one or more embodiment, the reaction vessel is permanently coupled as part of the H2S scrubbing system. In one or more embodiments, the reaction vessel is configured to be detachable from the system. For example, FIG. 1 shows isolation valves 151 and 152 that may be closed and decoupled from the system 100, permitting removal of reactor 150. The reaction vessel may be removed and replaced with another reactor, such as a "fresh" reactor (that is, one that has not been used in an embodiment process), taken out of an embodiment system for maintenance, service, or both, or for exchanging with another reactor configuration. A detachable reaction vessel in some instances may resemble a bomb, a small cylinder, or a glass beaker or jar.

Optionally, an embodiment of the H2S scrubbing system may include a reaction vessel configured with a settling trap for aggregating and collecting the insoluble sulfur reaction product. As shown in FIG. 3A, such a configuration may facilitate collection of the insoluble sulfur reaction product by having the product accumulate at least in part in the settling trap 380. The accumulation may be removable from the reaction vessel even during operation, such as by an isolation valve system that permits removal of solids with some liquids. Such a configuration may permit the reaction vessel to be used for a run where a sample of the insoluble sulfur reaction product needs to be taken quickly, where the expected build-up of insoluble sulfur reaction product may be significant as compared to the volume of the hydrogen sulfide reaction solution, or until the hydrogen sulfide reaction solution is fully depleted of metallic salts, for example.

In one or more embodiments, the reaction vessel is associated with a pressure monitoring system, such as a pressure sensor or gauge. In one or more embodiments, the pressure monitoring system is connected to the reaction vessel. In one or more embodiments, the pressure monitoring system is coupled upstream or downstream of the reaction vessel in a manner such that the pressure within the reaction vessel is detectable. For example, as seen in FIG. 1, pressure gauge 155 is configured as part of system 100 to detect the pressure in reactor 150 by being positioned downstream along line 153.

Products of the reaction vessel may include the insoluble sulfur reaction product and the hydrogen sulfide-free gas. The insoluble sulfur reaction product may pass from the reaction vessel by use of a settling trap or other aggregation means through the lower portion of the vessel either during operation or post-operation. In one or more embodiments, the hydrogen sulfide reaction solution may be circulated internally or externally from the reaction vessel and the insoluble sulfur reaction product may be mechanically filtered, strained, or otherwise separated, from the aqueous solution. The insoluble sulfur reaction product may pass from the H2S scrubbing system post-operation (sometimes along with some amount of the hydrogen sulfide reaction solution) as part of generally cleaning, refurbishing, repairing, or preparing the reaction vessel, for another operational run.

In one or more embodiments, the hydrogen sulfide-free gas passes from the reaction vessel and is introduced into the treated gas trap.

In one or more embodiments, the H2S scrubbing system may include a treated gas trap for removing water from the wet hydrogen sulfide-free gas. The hydrogen sulfide-free gas picks up water in the reaction vessel that was not present in the gas with hydrogen sulfide as introduced. Removing the water provides for a more accurate analysis of the residual hydrogen sulfide-free gas. After passing through the treated gas trap, the hydrogen sulfide-free gas is ready for analysis.

The treated gas trap in one or more embodiments may include a demister. The demister physically aggregates any water mist or other micro-sized droplets that form an aerosol in the hydrogen sulfide-free gas into liquid droplets. The demister also blocks or prevents any aqueous solution carryover or blow-through from the reaction vessel from passing the treated gas trap. Any liquid droplets that form fall out of the vapor. In FIG. 1, system 100 has post-reactor treatment vessel 170 downstream of the reactor 150. The first section of the post-reactor treatment vessel 170 (shown in partial reveal) contains a back-and-forth demister section 171 for knocking water physically out of the wet hydrogen sulfide-free gas. Liquid water settles to the bottom of post-reactor treatment vessel 170, which may be periodically or continually removed.

The treated gas in one or more embodiments may include a desiccant. The desiccant chemically removes any remaining water in the hydrogen sulfide-free gas that passes through it. The desiccant may be made from a hydroscopic material, including, but not limited to, silica gel, silica molecular sieves, silica-alumina gel, activated alumina, alkaline metal and alkali earth salts, such as magnesium chloride, and combinations thereof. In FIG. 1, in post-reactor treatment vessel 170 downstream of the back-and-forth demister section 171 is the desiccant section 172. The wet hydrogen sulfide-free gas passes from the demister section 171 and is introduced into the desiccant section 172, where the dry hydrogen sulfide-free gas forms.

In one or more embodiments, the hydrogen sulfide-free gas passes from the treated gas tap and is introduced into the receiver for gas without hydrogen sulfide.

Similar to the sources of gas with hydrogen sulfide and the inert purge gas, a receiver for gas without hydrogen sulfide in one or more embodiments may be provided for as a portable container, such as a tank, a cylinder, a bomb, a vessel, a canister, or other device that may hold the hydrogen sulfide-free gas at atmospheric or elevated pressure. In one or more embodiments, the receiver for gas without hydrogen sulfide may be a permanently coupled or connected line to downstream analytical equipment. In such a configuration, the receiver of the gas without hydrogen sulfide is "hard piped" to an embodiment system for intermittent or continuous use to receive gas without hydrogen sulfide from an embodiment system. As with the prior examples for the laboratory system, this would be a logical configuration for an embodiment system conducting multiple examinations in parallel or series to have a piece of analytical equipment coupled or connected to receive the hydrogen sulfide-free gas from the embodiment system. In FIG. 1, the dry hydrogen sulfide-free gas passes into remainder gas canister 130.

Figure 4:
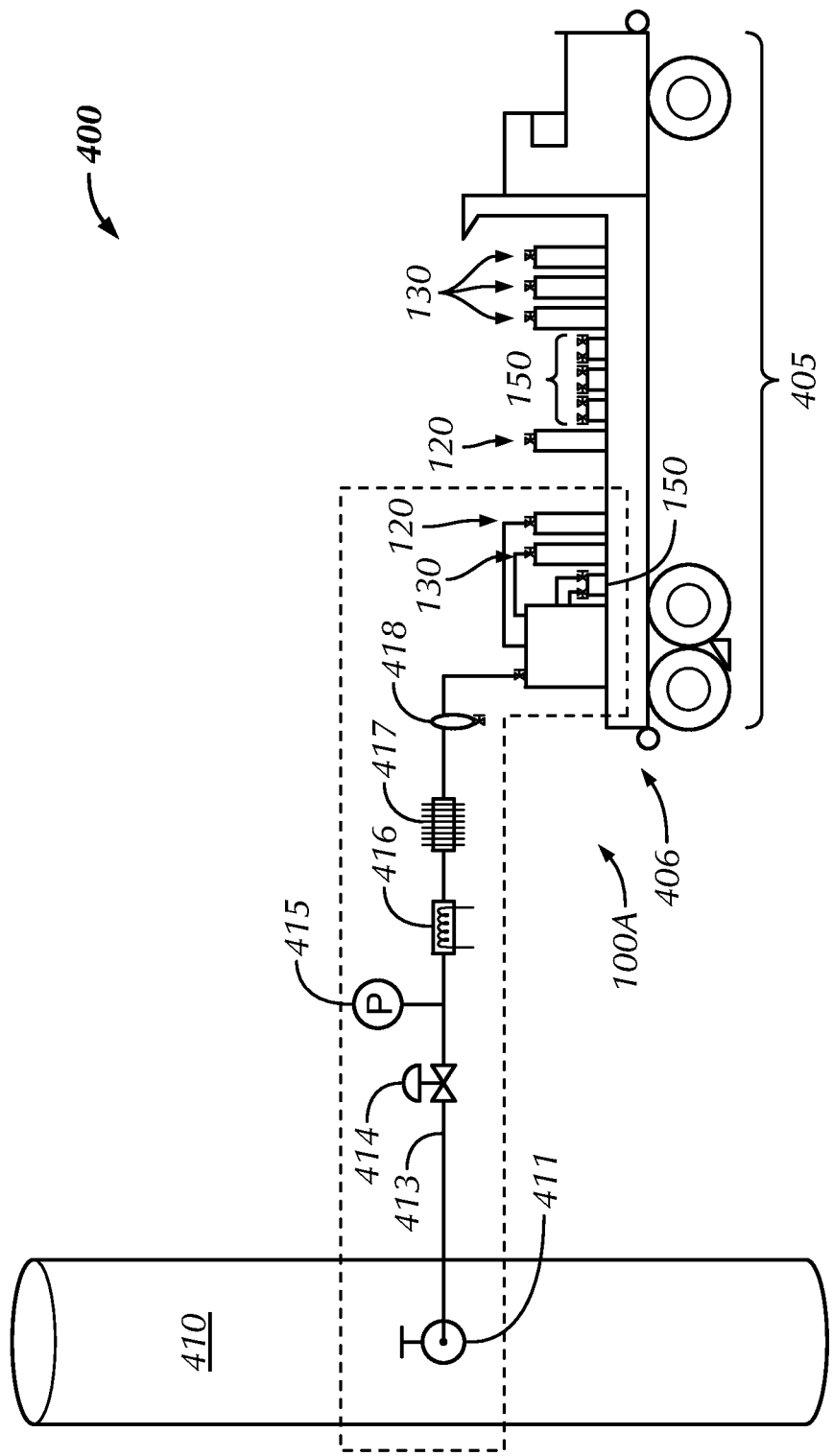
FIG. 4 is a drawing of a H2S scrubbing system as part of a mobile self-propelled vehicle according to one or more embodiments.

FIG. 4 is a drawing of a H2S scrubbing system mounted as part of a mobile, self-propelled vehicle, vessel, or platform. FIG. 4 shows a mobile vehicle, such as semi-truck 405, with a H2S scrubbing system 100A mounted on its truck bed 406. Mobile vehicles or vessels that are self-propelled include, but are not limited to, cars, trucks, ships, and airplanes. One or more embodiments may be a mobile, non-self-propelled vehicle, vessel, or platform. For example, a towed barge, a land- or water-borne skiff, or a land- or water-borne drilling platform or "rig", may be useful to convey the system to locations where samples are to be taken.

System 100A is coupled to a source for gas with H2S: a raw natural gas pipeline 410. Isolation valve 411 connects to line 413, which couples with system 100A to provide gas with H2S for sample collection. Line 413 is shown with several additional features coupled to the line, including flow control valve 414, a pressure sensor 415, a heating element 416, a fin cooler 417, and a liquids trap 418, all upstream of a charging chamber (not shown but part of system 100A).

In one or more embodiments, one or more sensors, or one or more flow control valves, or both, may be coupled upstream of the charging chamber and positioned between the source of gas with hydrogen sulfide and the charging chamber. For example, FIG. 4 shows a pressure sensor 415 downstream of flow control valve 414, where both are upstream of the charging chamber (not shown). Such a combination of a flow control valve and a pressure sensor may be used to throttle the introduced gas with hydrogen sulfide flowing into the charging chamber, as previously described.

In one or more embodiments, a heater may be coupled upstream of the charging chamber and positioned between the source of gas with hydrogen sulfide and the charging chamber. For example, FIG. 4 shows a portion of a heating element 416 wrapped around line 413 upstream of the charging chamber (not shown). A heater, which may be useful for warming the line to prevent the formation of hydrates after volume expansion, to vaporize any liquids that may have formed in the line, and to facilitate the gas with hydrogen sulfide for reaction with the metallic salt in the reaction vessel, may be any form of device that can transfer heat into the line. Examples include, but are not limited to, convection heaters, such as a heat exchanger and solar hydronic heaters, and radiant heaters, such as electrical tape and microwave transmitters. In one or more embodiments, heated fluids, such as exhaust gas from the operating vehicle, may be used to heat the line.

In one or more embodiments, a cooler may be coupled upstream of the charging chamber and positioned between the source of gas with hydrogen sulfide and the charging chamber. For example, FIG. 4 shows a portion of a condenser with a fin cooler 417 wrapped around line 413 upstream of the charging chamber (not shown). The cooler may be useful for cooling the line to prevent the gas with hydrogen sulfide from overheating the system, such as causing the hydrogen sulfide reaction solution to vaporize. The cooler may be any form of device that can extract heat from the line. Examples include, but are not limited to, convection coolers, such as a heat exchanger or a fan, and radiant coolers, such as cooling fins. In one or more embodiments, cooling fluids, such as refrigerant from the operating vehicle, may be used to chill the line.

In one or more embodiments, the line that couples the source of gas with hydrogen sulfide to the embodiment system may include a liquids trap. For example, FIG. 4 shows a portion of a liquid trap 418 coupled to line 413 upstream of the charging chamber (not shown). Liquids may form in the line to the charging chamber due to changes in temperature or pressure during movement between the source to the charging chamber, especially out in the field. The liquids trap may be useful to prevent any condensed liquid from entering the charging chamber. In one or more embodiments, the liquids from the liquids trap may be collected for analysis.

Semi-truck 405 is also shown with an additional inert purge tank 120, remainder gas canisters 130, and reactors 150. Such tanks, canisters, and reactors may be pre- or post-use. For example, one or more of the remainder gas canisters may contain dry hydrogen sulfide-free gas and one or more of the reactors may contain insoluble sulfur reaction product from prior sampling activities.

Method of Use

Figure 5:
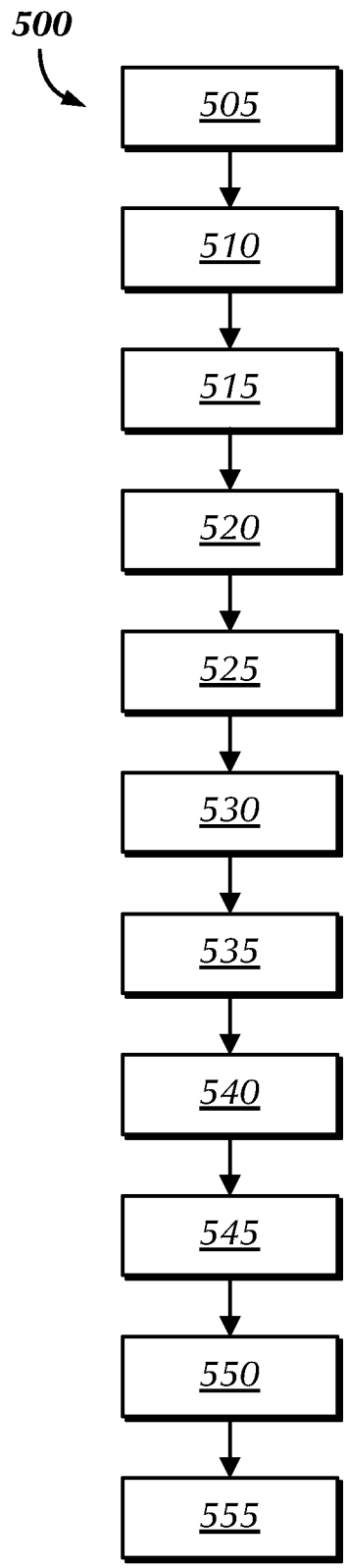
FIG. 5 is a process flow diagram for a method of using a H2S scrubber system according to one of more embodiments.

FIG. 5 is a process flow diagram for a method of using a H2S scrubber system.

In one or more embodiments, a source of gas with hydrogen sulfide may be provided. In FIG. 5, the method 500 includes providing a source of gas with hydrogen sulfide 505. In one or more embodiments, the source may be a portable source, such as a tank. FIG. 1 shows feed gas canister 110. In one or more embodiments, the source may be a fixed source, such a pipeline. FIG. 4 shows raw natural gas pipeline 410.

In one or more embodiments, a source of inert purge gas may be provided. In FIG. 5, the method 500 includes providing a source of inert purge gas 510. In one or more embodiments, the source may be a portable source, such as a tank. FIGS. 1 and 4 both show inert purge tank 120. In one or more embodiments, the source may be a fixed source, such as a pipeline.

In one or more embodiments of the method, a gas with hydrogen sulfide is introduced into the hydrogen sulfide scrubber system. In FIG. 5, the method 500 includes introducing the gas with hydrogen sulfide into the system 515. The introduced gas with hydrogen sulfide may be passed from the source describe previously and introduced into the charging chamber of the system. In FIG. 1, the gas with hydrogen sulfide passes from feed gas canister 110 and is introduced into system 100 via charge line 140. FIGS. 2A, 2B, and 2C, show alternative charging chamber configurations 140A, 140B, and 140C, respectively, that may be present in system 100 into which the gas with hydrogen sulfide may be introduced. In FIG. 4, the gas with hydrogen sulfide passes from raw natural gas pipeline 410 and is introduced into system 100A.

In one or more embodiments, the introduction of the gas with hydrogen sulfide is intermittent. That is, the gas with hydrogen sulfide is introduced into the charging chamber of the hydrogen sulfide scrubber system on an "as-needed" basis or on a regular, periodic basis. For example, an amount of gas is introduced such that a pressure is achieved in the charging chamber, which has a fixed volume, and then no further gas is introduced. In one or more embodiments, the introduction of the gas with hydrogen sulfide is continuous.

Regardless of the manner of introduction, the gas with hydrogen sulfide may be introduced unobstructed or may be introduced partially obstructed. In continually introducing the gas while partially obstructed, the pressure of the gas may be reduced by throttling, such as by using a flow control valve or an isolation valve, or by permanent means, such as an orifice or a venturi.

In one or more embodiments, the pressure of the gas with hydrogen sulfide is adjusted while being introduced into the system, such as by being depressurized. In one or more embodiments, the pressure of the gas with hydrogen sulfide is not adjusted while being introduced into the system. In such one or more embodiments, the pressure of the gas with hydrogen sulfide in the charging chamber as compared to the pressure of the gas with hydrogen sulfide in the source of the gas with hydrogen sulfide is in a ratio range of from about 1:1 to 1:2000, such as from about 1:1 to 1:1000, such as from about 1:1 to 1:500, such as from about 1:1 to 1:250, such as from about 1:1 to 1:100, such as from about 1:1 to 1:50, such as from about 1:1 to 1:25, such as from about 1:1 to 1:10, such as from about 1:1 to 1:5, such as from about 1:1 to 1:2.

In one or more embodiments, the temperature of the gas with hydrogen sulfide is adjusted while being introduced into the system. In one or more embodiments, the temperature of the gas with hydrogen sulfide is not adjusted while being introduced into the system. In such one or more embodiments, the gas with hydrogen sulfide is cooled while being introduced into the system. In such one or more embodiments, the gas with hydrogen sulfide is heated while being introduced into the system.

In one or more embodiments, the hydrogen sulfide treatment system is operated such that the charging chamber is fluidly isolated after receiving the gas with hydrogen sulfide. In FIG. 5, the method 500 includes isolating the charging chamber 520. Optionally, after receiving an amount of gas with hydrogen sulfide from the source of gas with hydrogen sulfide, all of the isolation or control, or both, valves both upstream and downstream of the charging chamber may be closed such that there is no flow between both the source for the gas with hydrogen sulfide and the charging chamber and between the charging chamber and the reaction vessel.

During isolation, the pressure of the gas within the charging chamber may be detected, such as by using a pressure monitoring system. In one or more embodiments, the pressure of the gas with hydrogen sulfide is the same as the pressure of the gas with hydrogen sulfide in the source. In one or more embodiments, the pressure of the gas with hydrogen sulfide in the charging chamber is less than the pressure of the gas with hydrogen sulfide in the source.

In one or more embodiments, the pressure of the gas with hydrogen sulfide is adjusted during isolation in the charging chamber, such as by being depressurized. In one or more embodiments, such as embodiment configurations as given in FIGS. 2A and 2C, the gas with hydrogen sulfide in one charging chamber 140 may be expanded into more than one charging chamber, thereby decreasing its pressure while still isolated within the charging chamber 140A and 140C. This can prevent over-pressurization of the reaction vessel as well as provide an additive safety feature for use of the system, especially considering coupling with full-pressure sources, by manually permitting pressure letdown. As previously described, in one or more embodiments, the volume of the charging chamber before expansion to the volume of the charging chamber after expansion is in a ratio range of from about greater than 1:1 to 1:5. In such one or more embodiments, the pressure of the gas with hydrogen sulfide in the charging chamber after pressure reduction compared to the pressure before pressure reduction is in a range of from about greater than 1:1 to 1:5, such as from about greater than 1:1 to 1:4, and such as from about greater than 1:1 to 1:3, such as from about greater than 1:1 to 1:2.

In such embodiments where there is intermittent introduction of gas with hydrogen sulfide into the hydrogen sulfide treatment system, the operation of the system may include repeating the intermittent introduction of the gas with hydrogen sulfide into the charging chamber and isolating the flow into the charging chamber. This process may be repeated as many times as necessary to accomplish the one or more purposes for using the hydrogen sulfide scrubber system, including, but not limited to, obtaining sufficient insoluble sulfur reaction product, hydrogen sulfide-free gas, or both, for analysis purposes.

In one or more embodiments of the method, the hydrogen sulfide treatment system is operated such that the gas with hydrogen sulfide passes from the charging chamber and is introduced into the reaction vessel. In FIG. 5, the method 500 includes passing the gas with hydrogen sulfide from the charging chamber and introducing it into the reaction chamber 525. In FIG. 1, the gas with hydrogen sulfide passes from charging line 140 and is introduced into reactor 150. FIGS. 2A, 2B, and 2C, show charging chamber configurations 140A, 140B, and 140C, respectively, that may pass gas with hydrogen sulfide into the reactor 150. FIGS. 3A and 3B show alternative reactors 150A and 150B, respectively, that may be present in system 100 into which the gas with hydrogen sulfide may be introduced. In FIG. 4, reactor 150 is shown on truck bed 406 as part of system 100A.

In one or more embodiments, the introduction of the gas with hydrogen sulfide is intermittent. That is, the gas with hydrogen sulfide is introduced into the reaction vessel of the hydrogen sulfide scrubber system on an "as-needed" basis or on a periodic basis. In such an instance, the gas with hydrogen sulfide may be introduced such that an operational pressure limit for the reaction vessel is not exceeded. In another instance, gas with hydrogen sulfide is introduced until a quantity of insoluble sulfur reaction product is produced in the reaction vessel. In another instance, the gas with hydrogen sulfide is introduced until back pressure exerted by previously produced hydrogen sulfide-free gas prevents further introduction of the gas with hydrogen sulfide. Other reasons, purposes, or goals for the intermittent introduction of the gas with hydrogen sulfide may be assumed.

Where there is intermittent introduction of the gas with hydrogen sulfide, the operation of the hydrogen sulfide treatment system may include repeating one or more times the intermittent introduction of the gas with hydrogen sulfide from the charging chamber into the reaction vessel and then isolating the flow between the charging chamber and the reaction vessel. This process may be repeated as many times as necessary to accomplish a one or more goals for using the hydrogen sulfide scrubber system, including, but not limited to, obtaining sufficient insoluble sulfur reaction product, hydrogen sulfide-free gas, or both, for analysis purposes.

In other one or more embodiments, the introduction of the gas with hydrogen sulfide is continuous. The gas with hydrogen sulfide may be introduced unobstructed or may be introduced partially obstructed. In one or more embodiments, the gas with hydrogen sulfide is depressurized while being introduced. In continually introducing the gas with hydrogen sulfide while partially obstructed, the pressure of the gas may be reduced by throttling, such as by using a flow control valve or an isolation valve, or by permanent means, such as an orifice or a venturi.

In one or more embodiments, the pressure of the gas with hydrogen sulfide is adjusted while being introduced into the reactor, such as by being depressurized. In one or more embodiments, the gas with hydrogen sulfide is not adjusted while being introduced into the reactor. In such one or more embodiments, the pressure of the gas with hydrogen sulfide in the reactor to the pressure of the gas with hydrogen sulfide in the charging chamber is in a ratio range of from about 1:1 to 1:2000, such as from about 1:1 to 1:1000, such as from about 1:1 to 1:100, such as from about 1:1 to 1:10, such as about 1:1 to 1:5, and such as from about 1:1 to 1:2.

In one or more embodiments, the hydrogen sulfide treatment system is operated such that the gas with hydrogen sulfide is converted into the insoluble sulfur reaction product and the hydrogen sulfide-free gas using the hydrogen sulfide reaction solution in the reaction vessel. In FIG. 5, the method 500 includes converting the gas with hydrogen sulfide into the insoluble sulfur reaction product and the hydrogen sulfide-free gas 530. In FIG. 1, the gas with hydrogen sulfide bubbles through the hydrogen sulfide reaction solution 160 contained in reactor 150. The hydrogen sulfide is stripped from the gas and forms a wet hydrogen sulfide-free gas 162. The reaction within the hydrogen sulfide reaction solution converts the hydrogen sulfide into an insoluble sulfur reaction product 161. The insoluble sulfur reaction product—a metallic sulfide salt—settles out of the hydrogen sulfide reaction solution 160.

In some instances, the configuration of the reaction vessel for the hydrogen sulfide treatment system is one of reactors 150A and 150B as given in FIGS. 3A and 3B, respectively, instead the reactor 150 provided with system 100 of FIG. 1. A person of ordinary skill using the content of this disclosure may appreciate the engineering necessary to substitute the partial or total features of either of the reaction vessels provided for in FIGS. 3A and 3B with that of the reaction vessel feature in FIG. 1.

In one or more embodiments, an acid or an acid precursor is added to the hydrogen sulfide reaction solution during operation to adjust the pH of the solution.

In one or more embodiments, a buffer solution is added to the hydrogen sulfide reaction solution during operation to adjust the pH of the solution.

In one or more embodiments, the hydrogen sulfide treatment system is operated such that the hydrogen sulfide-free gas passes from the reaction vessel and is introduced into the treated gas trap. In FIG. 5, the method 500 includes passing the hydrogen sulfide-free gas from the reaction vessel and introducing it into the treated gas trap 535.

In such embodiments, the hydrogen sulfide-free gas may traverse through a demister section in the treated gas trap. For example, in FIG. 1 the post-reactor treatment vessel 170 includes a back-and-forth demister section 171 for the wet hydrogen sulfide-free gas to traverse to physically remove water mist or gas-borne droplets.

In such embodiments, the hydrogen sulfide-free gas may traverse through a desiccant section in the treated gas trap. For example, in FIG. 1 the post-reactor treatment vessel 170 includes a desiccant section 172 for the wet hydrogen sulfide-free gas to traverse to chemically remove water and form dry hydrogen sulfide-free gas.

In one or more embodiments, the hydrogen sulfide treatment system is operated such that the hydrogen sulfide-free gas passes from the H2S scrubbing system into the receiver for gas without hydrogen sulfide. In FIG. 5, the method 500 includes passing the hydrogen sulfide-free gas from the system 540. In FIG. 1, the dry hydrogen sulfide-free gas passes into remainder gas canister 130.

After an amount of gas with hydrogen sulfide is introduced into the system, optionally the introduction of gas may be halted. In doing so, a valve, such as a flow control or an isolation valve, between the source for the gas with hydrogen sulfide and the charging chamber may be closed. In closing the valve, no gas with hydrogen sulfide may be introduced into the system. For example, in FIG. 1 either isolation valve 111 or 112 may be closed to terminate the gas with hydrogen sulfide flow from feed gas canister 110. In FIG. 4, isolation valve 411 may be closed to terminate the gas with hydrogen sulfide from raw natural gas pipeline 410.

In one or more embodiments of the method, an inert purge gas is introduced into the hydrogen sulfide scrubber system such that any non-inert purge gas is swept from the system. In FIG. 5, the method 500 includes introducing the inert purge gas into the system 545. The inert purge gas is introduced into the hydrogen sulfide scrubbing system through the charging chamber such that any residual gas with hydrogen sulfide in the system upstream of the reaction vessel is pushed into the reaction vessel with the inert purge gas. Any residual gas with hydrogen sulfide passing into the reaction vessel undergoes a similar conversion as previously described. The introduction of the inert purge gas also substantially drives all of the residual hydrogen sulfide-free gas in the system towards the receiver for gas without hydrogen sulfide. The agitation by the inert purge gas agitates the hydrogen sulfide reaction solution such that substantially all the insoluble sulfur reaction product suspended in the solution falls out of solution. If any post-reaction vessel treatment occurs, the hydrogen sulfide-free gas downstream of the reaction vessel is pushed through such treatment before entering the receiver for gas without hydrogen sulfide. In FIG. 1, the inert purge gas passes from feed gas canister 110 into system 100 and drives all gases towards remainder gas canister 130.

In one or more embodiments, the hydrogen sulfide treatment system is operated such that the receiver for gas without hydrogen sulfide is fluidly isolated. In FIG. 5, the method 500 includes isolating fluidly the receiver for gas without hydrogen sulfide 550. After receiving an amount of hydrogen sulfide-free gas and inert purge gas from the system, at least one of the valves upstream of the receiver for gas without hydrogen sulfide, such as a control or isolation valve, may be closed such that there is no fluid connectivity between the receiver for gas without hydrogen sulfide and the rest of the system. In FIG. 1, either isolation valve 131 or 173 may be closed to isolate remainder gas canister 130.

In one or more embodiments, the hydrogen sulfide treatment system is operated such that the reaction vessel is fluidly isolated. In FIG. 5, the method 500 includes isolating fluidly the reaction vessel 555. In one or more embodiments, after receiving an amount of hydrogen sulfide-free gas and the inert purge gas has swept through the system, at least one of the valves upstream and at least one of the valves downstream of the reaction vessel, such as a control or isolation valve, may be closed such that there is no flow between the reaction vessel and the rest of the system. In FIG. 1, either isolation valve 142 or 155 upstream of the reactor 150 and either isolation valve 152 or 174 downstream of the reactor 150 may be closed to isolate reactor 150.

After an amount of inert purge gas is introduced into the system, optionally the introduction of gas may be halted. In doing so, a valve, such as a control or an isolation valve, between the source for the inert purge gas and the charging chamber may be closed. In closing the valve, no inert purge gas may be introduced into the system. For example, in FIG. 1 either isolation valve 121 or 122 may be closed to terminate the inert purge gas flow.

After the receiver for gas without hydrogen sulfide is isolated, the hydrogen sulfide-free gas may be recovered. For example, in FIG. 1 the dry hydrogen sulfide-free gas may be recovered by decoupling the remainder gas canister 130 from the rest of system 100. In FIG. 4, several remainder gas canisters 130 are shown not coupled to system 100A located on the truck bed 406. One or more of such canisters 130 may contains hydrogen sulfide-free gas for analysis.

After the reaction vessel is isolated, the insoluble sulfur reaction product may be recovered. For example, in FIG. 1 the insoluble sulfur reaction product may be recovered by decoupling the reactor 150 from the rest of system 100. In FIG. 4, several reactors 150 are shown not coupled to system 100A located on the truck bed 406. One or more of such reactors 150 may contains insoluble sulfur reaction product for analysis.

In one or more embodiments, post-collection analysis may be useful, such as using XRD (X-ray powder diffraction) analysis on the insoluble sulfur reaction product, to provide for managing and adapting the system and method for future collection from the same or similar sources, such as system configuration and hydrogen sulfide reaction solution composition.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and variations thereof means that the subsequently described event or circumstances may or may not occur. The description includes instances where the event or circumstance occurs and instances where it does not occur.

When the word "approximately" or "about" and variations thereof are used, this term may mean that there can be a variance in value of up to ±10%, of up to 5%, of up to 2%, of up to 1%, of up to 0.5%, of up to 0.1%, of up to 0.01%.

The term "substantially" and variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed:

1. A hydrogen sulfide scrubber system, comprising:
    a charging chamber, where the charging chamber is configured to be fluidly isolated from a source of gas with hydrogen sulfide, a source of an inert purge gas, and a reaction vessel;
    the reaction vessel coupled downstream of the charging chamber, where the reaction vessel is configured to intimately intermix the gas with hydrogen sulfide with a hydrogen sulfide reaction solution to form a hydrogen sulfide-free gas and an insoluble sulfur reaction product, and where the reaction vessel is configured to be fluidly isolated from both the charging chamber and a treated gas trap; and
    the treated gas trap coupled downstream of the reaction vessel;
    where the hydrogen sulfide scrubber system is configured to couple to the source of gas with hydrogen sulfide upstream of the charging chamber, to couple to the source of an inert purge gas upstream of the charging chamber, and to couple to a receiver for the hydrogen sulfide-free gas downstream of the treated gas trap.

2. The system of claim 1, where the system is configured to receive a gas with hydrogen sulfide having a hydrogen sulfide concentration in a range of from about 0.1 to 40 mol. % (mole percent).

3. The system of claim 1 where the charging chamber is configured as a plurality of charging chambers coupled in series.

4. The system of claim 1 where the charging chamber is configured as a plurality of charging chambers coupled in parallel.

5. The system of claim 1 where the charging chamber is configured as a plurality of charging chambers coupled as an array.

6. The system of claim 1, where the volume of the charging chamber and the volume of a combined the charging chamber, a line coupling the charging chamber and the reaction vessel, and the free-space of the reaction vessel, is in a ratio range of from about 1:2 to 1:2000.

7. The system of claim 1, where the volume of the charging chamber is configured to be expandable, and the volume of the charging chamber before expansion and the volume of the charging chamber after expansion is in a ratio rage of from about 1:1 to 1:5.

8. The system of claim 1, where the reaction vessel is configured such that at least a portion is non-opaque.

9. The system of claim 1, where the reaction vessel is configured to withstand an internal pressure in a range of from about 14.7 to 5000 pounds per square inch (psi).

10. The system of claim 1, where the reaction vessel is configured to withstand a temperature in a range of from about 0 to 200° C.

11. The system of claim 1, where the hydrogen sulfide reaction solution comprises water with a metallic salt.

12. The system of claim 1, where the treated gas trap comprises a desiccant section.

13. The system of claim 1, further comprising a flow control valve coupled upstream of the charging chamber and positioned between the source of gas with hydrogen sulfide and the charging chamber.

14. The system of claim 1, further comprising a heater coupled upstream of the charging chamber and positioned between the source of gas with hydrogen sulfide and the charging chamber.

15. The system of claim 1, further comprising a cooler coupled upstream of the charging chamber and positioned between the source of gas with hydrogen sulfide and the charging chamber.

16. The system of claim 1, further comprising a flow control valve coupled upstream of the reaction vessel and positioned between the charging chamber and the reaction vessel.

* * * * *